United States Patent
Takechi

(10) Patent No.: US 8,577,397 B2
(45) Date of Patent: Nov. 5, 2013

(54) WIRELESS COMMUNICATION SYSTEM, COMMUNICATION CONTROL METHOD, MOBILITY MANAGEMENT APPARATUS, MOBILE TERMINAL AND BASE STATION

(75) Inventor: Ryuichi Takechi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/611,247

(22) Filed: Sep. 12, 2012

(65) Prior Publication Data

US 2013/0059611 A1     Mar. 7, 2013

Related U.S. Application Data

(63) Continuation of application No. PCT/JP2010/054575, filed on Mar. 17, 2010.

(51) Int. Cl.
*H04W 64/00* (2009.01)

(52) U.S. Cl.
USPC ........................................ 455/458; 455/412.1

(58) Field of Classification Search
USPC .............. 455/412.1, 412.2, 414.1, 456.1, 458
See application file for complete search history.

(56) References Cited

U.S. PATENT DOCUMENTS

| | | | |
|---|---|---|---|
| 8,254,955 | B2 | 8/2012 | Nakamura et al. |
| 2009/0191848 | A1* | 7/2009 | Helferich ................... 455/412.1 |
| 2009/0270111 | A1 | 10/2009 | Nakamura et al. |
| 2010/0227627 | A1 | 9/2010 | Ishii et al. |

FOREIGN PATENT DOCUMENTS

| | | |
|---|---|---|
| JP | 2009-77368 | 4/2009 |
| JP | 2009-267706 | 11/2009 |

OTHER PUBLICATIONS

International Search Report dated Apr. 27, 2010, from corresponding International Application No. PCT/JP2010/054575.
3GPP TS 23.401 V8.7.0 3rd Generation Partnership Project; Technical Specification Group Services and System Aspects; General Packet Radio Service (GPRS) enhancements for Evolved Universal Terrestrial Radio Access Network (E-UTRAN) access (Release 8), Sep. 2009.
Notice of Rejection Grounds dated Jun. 11, 2013, from corresponding Japanese Application No. 2012-505371.

* cited by examiner

*Primary Examiner* — Sam Bhattacharya
(74) *Attorney, Agent, or Firm* — Katten Muchin Rosenman LLP

(57) ABSTRACT

A wireless communication system includes a first base station; one or more second base stations having transmission power lower than the first base station; a mobility management apparatus for managing a location of a mobile terminal in a location registration area accommodating the first base station and the one or more second base stations. The mobility management apparatus includes a selecting unit that selects at least one of the second base stations transmitting a paging signal from among the one or more second base stations, and a paging unit that transmits a paging signal to the mobile terminal via the first base station accommodated in the location registration area, and the at least selected one of the second base stations.

15 Claims, 8 Drawing Sheets

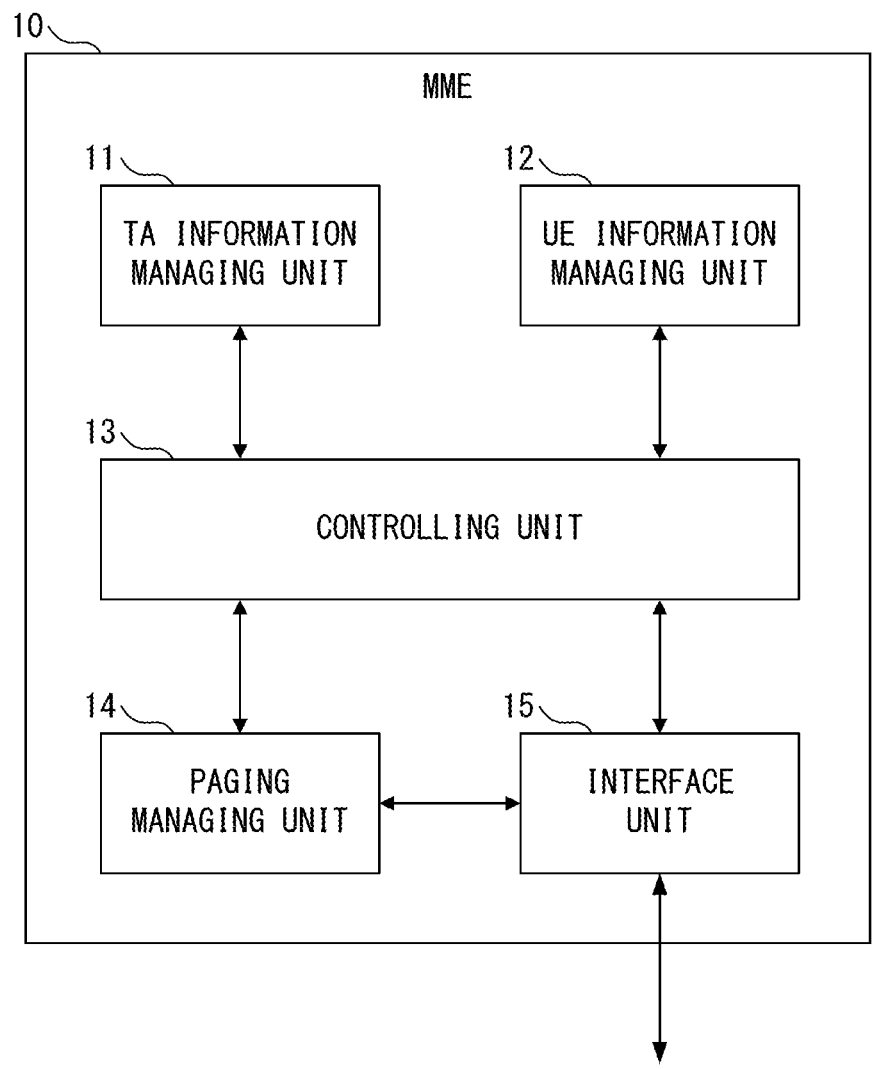
F I G. 2

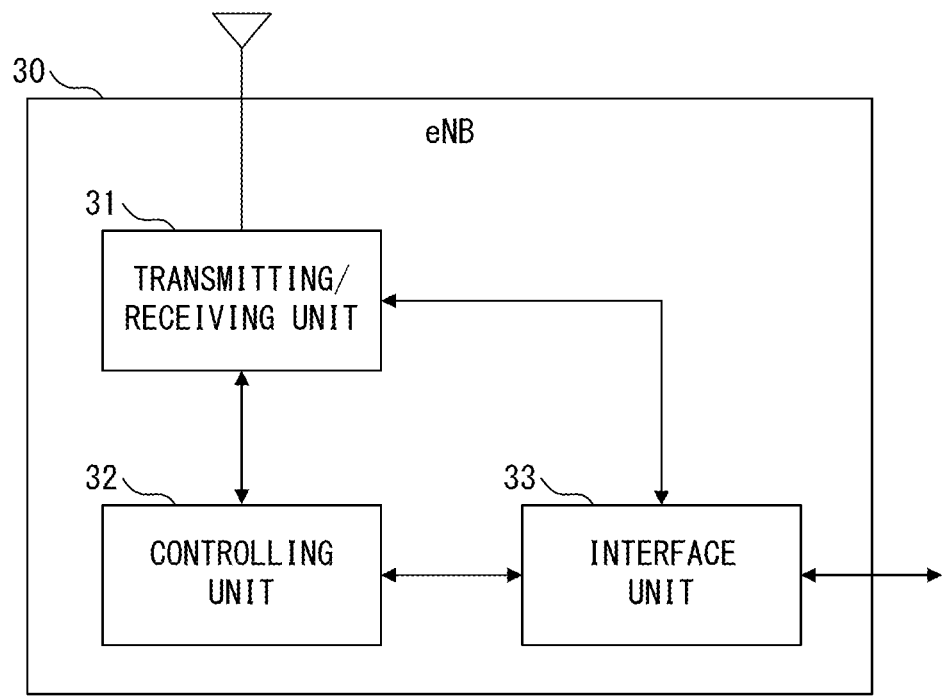
F I G. 4

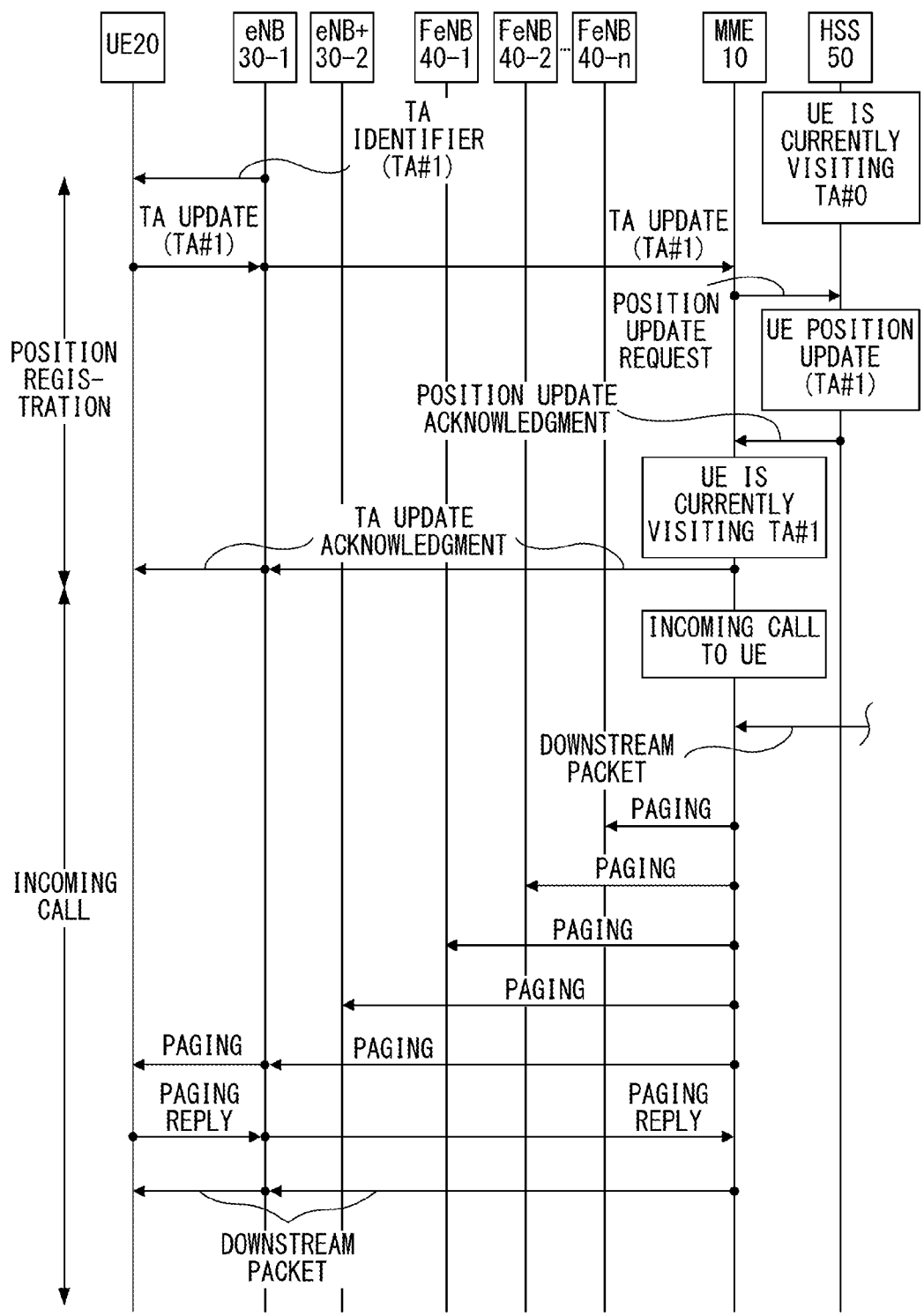
F I G. 5

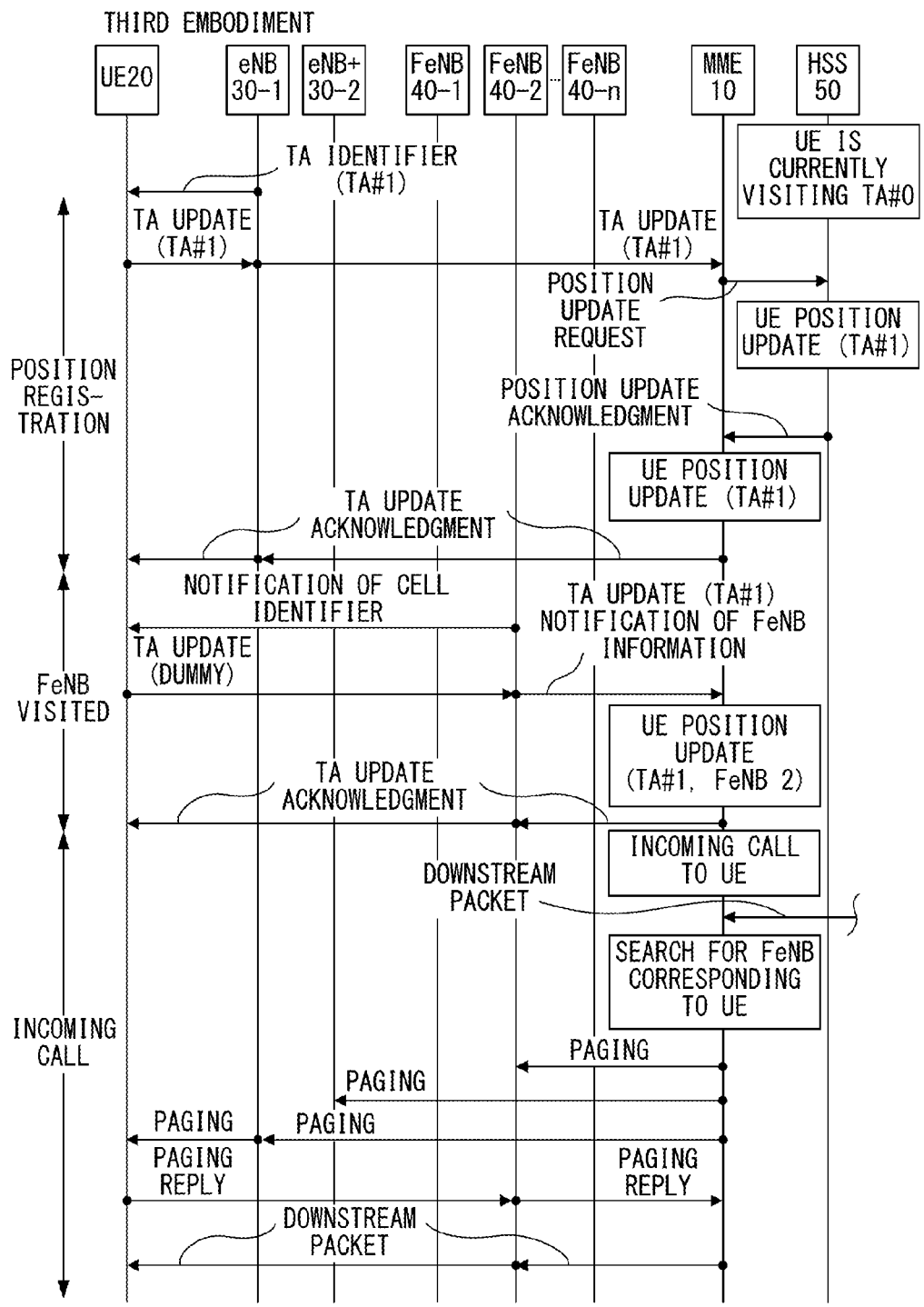
F I G. 8

WIRELESS COMMUNICATION SYSTEM, COMMUNICATION CONTROL METHOD, MOBILITY MANAGEMENT APPARATUS, MOBILE TERMINAL AND BASE STATION

CROSS-REFERENCE TO RELATED APPLICATION

This application is a continuation of International Application PCT/JP2010/054575 filed on Mar. 17, 2010 and designated the U.S., the entire contents of which are incorporated herein by reference.

FIELD

This inventions are related to a technical field of a wireless communication system, a communication control method in the system, and a mobility management apparatus, a mobile terminal and a base station, which are used in the system, and more particularly, to a technical field of a control performed at the time of paging for a mobile terminal.

BACKGROUND

In a wireless communication system, a location of a mobile terminal (UE: User Equipment) expected to move by straddling cells provided by base stations is managed. At this time, a mobility management entity included in upper node of a network manages a location of each mobile terminal not in units of base stations of visited cells but in units of location registration areas each composed of a set of cells. In a Long Term Evolution (LTE) wireless system that is one of next-generation wireless systems, these mobility management entity and location registration area are called MME (Mobility Management Entity) and a Tracking Area (TA), respectively.

Additionally, when an incoming call to a mobile terminal occurs, the MME pages the mobile terminal by transmitting a paging signal to all base stations within a TA to which a location of the mobile terminal is registered.

For example, the following prior art document discloses procedures for registering a location of a mobile terminal or procedures for a paging process in LTE.

Patent Document 1: Japanese Laid-Open Patent Publication No. 2009-77368

Non-Patent Document

Non-Patent Document 1: 3GPP TS 23.401 v8.7.0

SUMMARY

To solve the above described problems, a disclosed wireless communication system includes the first base station, one or more second base stations having transmission power lower than the first base station, and a mobility management apparatus for managing a location of a mobile terminal in a location registration area accommodating the first base station and the one or more second base stations. Moreover, the mobility management apparatus includes selecting means configured to select at least one of the second base stations transmitting a paging signal from among the one or more second base stations, and paging means configured to transmit a paging signal to the mobile terminal via the first base station accommodated in the location registration area and the at least selected one of the second base stations.

In the disclosed wireless communication system, a location registration area such as a TA managed by the mobility management apparatus such as MME or the like accommodates one or a plurality of first base stations, and a plurality of second base stations having transmission power relatively lower than the first base stations. For example, the first base stations are base stations that respectively cover a relatively wide cell range such as a macro-cell and have relatively high transmission power. In contrast, the second base stations are base stations that cover a relatively small cell range such as a micro-cell, a femto-cell or the like and have relatively low transmission power.

The selecting means selects at least one of the second base stations transmitting the paging signal at the time of paging from among the one or more second base stations. Preferably, the selecting means selects the second base station that a mobile terminal to be paged is currently visiting. At this time, for example, as will be described later, the selecting means selects the second base station that the mobile terminal is currently visiting by respectively referencing information for identifying a visited location registration area and information for identifying a visited second base station for each mobile terminal registered in the mobility management apparatus at the time of location registration when the mobile terminal enters the location registration area.

The paging means transmits a paging signal to all the first base stations within a location registration area, and to the second base station selected by the selecting means when an incoming call occurs to a target mobile terminal. Namely, it is preferable that the paging signal is not transmitted to the second base station that is not selected by the selecting means even if the second base station is accommodated in the location registration area that the mobile terminal, to which an incoming call is to occur, is visiting.

Additionally, to solve the above described problems, a disclosed communication control method is a method for controlling a communication in the above described wireless communication system. Specifically, the disclosed control information includes a selecting step of executing processes similar to those executed by the selecting means included in the wireless communication system, and a paging step of executing processes similar to those executed by the paging means.

Furthermore, to solve the above described problems, a disclosed mobility management apparatus is an apparatus for managing a movement of a mobile terminal in the above described wireless communication system. The mobility management apparatus includes the above described selecting means and paging means.

Still further, to solve the above described problems, a disclosed mobile terminal is a mobile terminal for making a communication by being connected to the above described wireless communication system. The mobile terminal includes first notifying means configured to notify a mobility management apparatus of base station information for identifying the second base station accommodating the mobile terminal.

Still further, to solve the above described problems, a disclosed base station is a base station (such as the above described second base station) for making a communication by being connected to the above described wireless communication system. The base station includes second notifying means configured to notify a mobility management apparatus of base station information for identifying the second base station accommodating a mobile terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a configuration example of a mobility management apparatus;

FIG. 4 is a block diagram illustrating a configuration of a base station;

FIG. 5 is a sequence diagram illustrating a location registration process and a paging process according to a conventional technique;

FIG. 8 is a sequence diagram illustrating a location registration process and a paging process according to the third embodiment.

DESCRIPTION OF EMBODIMENTS

In recent years, in a wireless communication system such as LTE or the like, introduction of small base stations such as a so-called micro-cell, a femto-cell or the like having relatively low transmission power for accommodating a small number of mobile terminals has been studied. Such small base stations can provide a communication environment at a point that is arranged, for example, within a building and cannot be fully covered by a conventional base station. If such small base stations are popularized and arranged in each home or each building in the future, the number of base stations is expected to explosively increase. For this reason, small base stations are popularized and arranged in each home or each building in the future, the number of base stations accommodated in one TA is expected to explosively increase.

Incidentally, a TA managed by MME accommodates a plurality of base stations as described above, and the MME cannot grasp in which cell a mobile terminal to be paged is visiting at the time of paging in the present situation. If the MME performs paging for a mobile terminal within a TA in such a state, a paging signal is transmitted to all base stations within the TA, leading to a significant increase in a processing load.

The prior art document discloses a configuration where an individual TA is set for each small base station and MME makes location registration in units of TAs respectively set for small base stations in addition to location registration made in units of conventional TAs. However, the above described technique causes a new technical problem such that the location registration process is needed each time a mobile terminal enters/exits a relatively small cell of a small base station, leading to an increase in a load. This technique also causes a problem such that the number of small base stations that can be installed is restricted due to an upper limit number of preset TAs in a standard such as LTE or the like.

In light of the above described problems, an object of the present invention is to provide a wireless communication system, a communication control method, a mobility management apparatus, a mobile terminal and a base station, which can preferably reduce a load of paging performed for a mobile terminal that visits a TA including a plurality of small base stations.

Embodiments according to the present invention are described in detail below with reference to the drawings.

(1) First Embodiment

Figure 1:
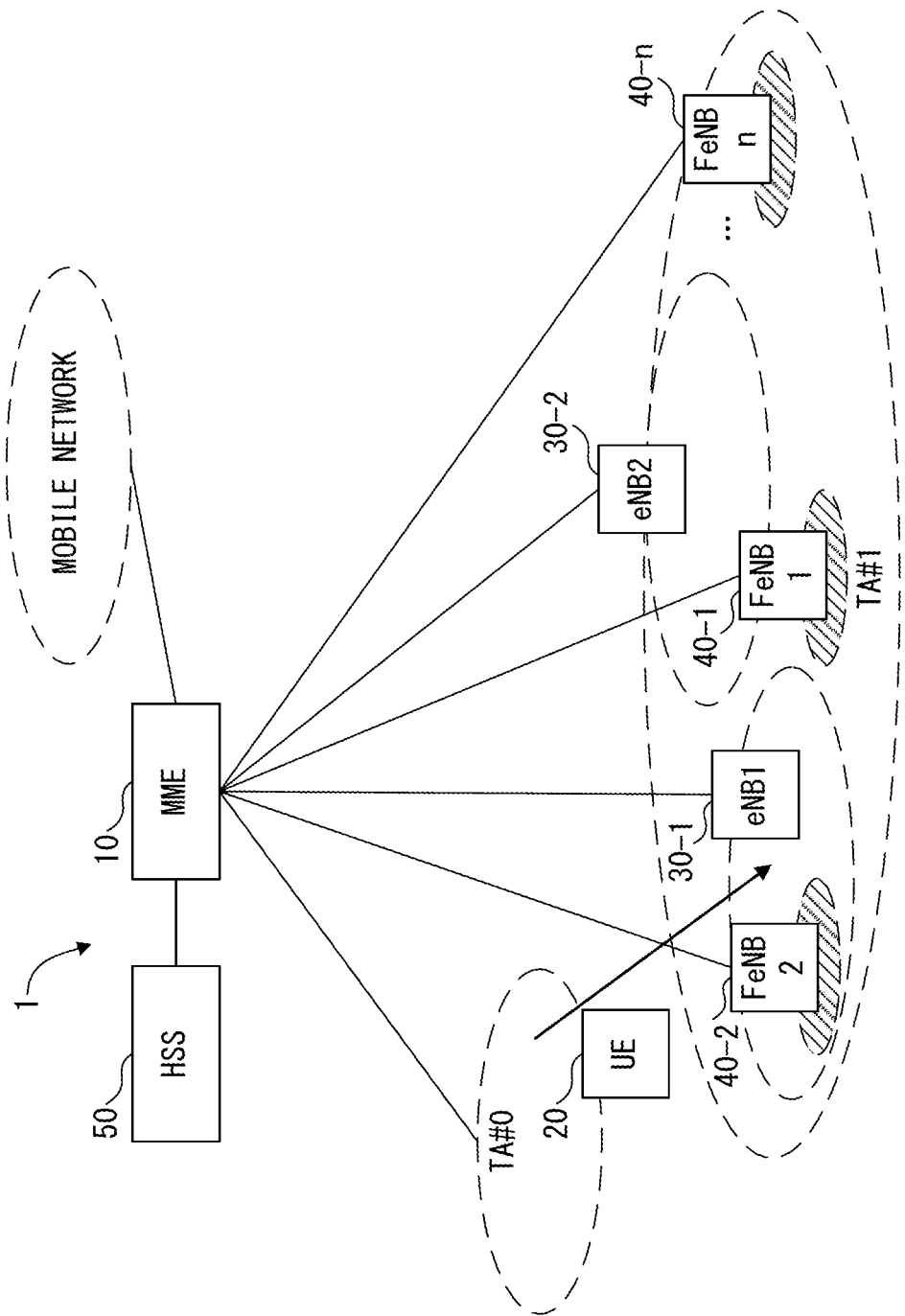
FIG. 1 illustrates a configuration example of a wireless communication system.

FIG. 1 illustrates a configuration of a wireless communication system 1 according to a first embodiment.

As illustrated in FIG. 1, the wireless communication system 1 according to the first embodiment is configured by including a mobility management apparatus (hereinafter referred to as MME) 10, a user terminal (hereinafter referred to as UE) 20, base stations (hereinafter referred to as eNBs (evolved Node B) 30-1 and 30-2, small base stations (hereinafter referred to as FeNBs (Femto evolved Node B) 40-1 to 40-n, and a home subscriber server (hereinafter referred to as HSS) 50. The following description is provided by using an expression "eNB 30" if there is no need to make a distinction between eNBs 30-1 and 30-2. Similarly, the description is provided by using an expression "FeNB 40" if there is no need to make a distinction among the FeNBs 40-1 to 40-n.

The MME 10 is one specific example of the mobility management apparatus. The MME 10 has tracking areas (hereinafter referred to as TAs) as a location registration area, and manages a movement of UE 20 in units of TAs. Such TAs indicate an area formed by cells provided by one or more base stations. In the following description, "base station that provides a cell forming TA" is hereinafter referred to simply as "base station forming TA". Similarly, "base station that provides a cell visited by a mobile terminal" is sometimes referred to simply as "base station visited by a mobile terminal".

A configuration of the MME 10 is described with reference to a block diagram of FIG. 2. As illustrated in FIG. 2, the MME 10 is configured by including a TA information managing unit 11, a UE information managing unit 12, a controlling unit 13, a paging managing unit 14 and an interface unit 15.

The TA information managing unit 11 stores and manages information of the eNBs 30-1 and 30-2 and the FeNBs 40-1 to 40-n, which form a TA subordinate to the MME 10, and information indicating locations of TAs. The TA information managing unit 11 manages the information, for example, by assigning a base station identifier as an identifier unique to each of the eNBs 30-1 and 30-2 and the FeNBs 40-1 to 40-n.

The UE information managing unit 12 stores and manages information for identifying a TA currently visited by the UE 20 as location information of the UE 20. If a plurality of TAs are formed subordinately to the MME 10, the UE information managing unit 12 manages the information by assigning a TA identifier that is a unique identifier to each of the TAs.

The controlling unit 13 controls operations of the units included in the MME 10 based on a control signal transmitted/received to/from the interface unit 15, and the information stored in the TA information managing unit 11 or the UE information managing unit 12. For example, the controlling unit 13 executes a UE location registration process by updating a TA identifier, which is stored in the HSS 50 and indicates a TA visited by the UE 20, according to a TA update notification transmitted from the UE 20 that is currently visiting the TA #1.

Additionally, the controlling unit 13 is one specific example of selecting means, searches for an FeNB 40 visited by the UE 20 at the time of paging performed for the UE 20, and notifies the paging managing unit 14 of the searched FeNB 40. A specific method for searching for the FeNB 40 will be described in detail later.

The paging managing unit 14 is configured to control a call process for the UE 20, and is one specific example of paging means. The paging managing unit 14 receives a notification of all the eNBs 30-1 and 30-2 and the searched FeNB within the TA#1, and transmits a paging signal.

The interface unit 15 is connected to a mobile communication network, makes a connection to the eNBs 30-1 and 30-2, the FeNBs 40-1 to **40-*n*, the HSS 50** and the mobile network, and transmits/receives a control signal.

The UE 20 is one specific example of the mobile terminal. The UE 20 makes a connection to communicate with a corresponding eNB 30 or FeNB 40 in a cell subordinate to any of the the eNBs 30 or the FeNBs 40. Since the UE 20 is a mobile terminal, a case of moving between different TAs with a movement of a user who is carrying the UE 20 is assumed. The MME 10 receives a location registration update notification from the UE 20 at the time of such a movement between TAs, and executes a location registration process.

Figure 3:
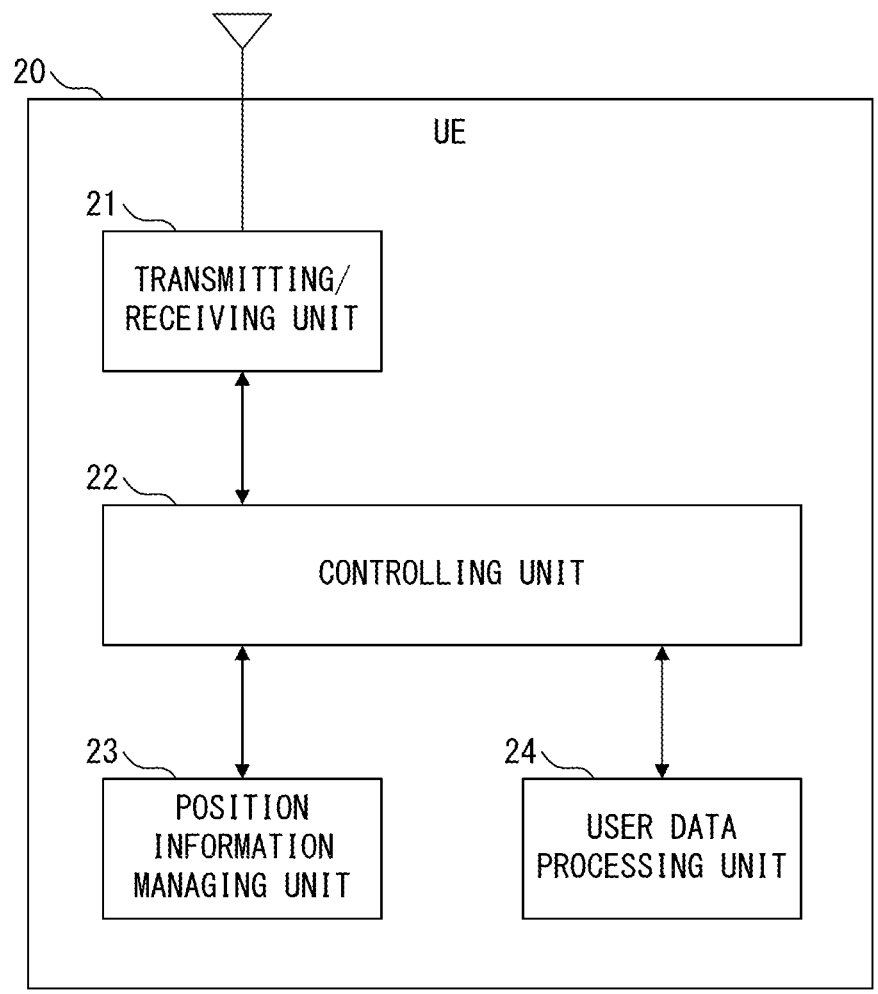
FIG. 3 is a block diagram illustrating a configuration of a mobile terminal.

A configuration of the UE 20 is described with reference to a block diagram of FIG. 3. The UE 20 is a terminal that enables a wireless communication, and is a stationary or portable small terminal or the like. As illustrated in FIG. 3, the UE 20 is configured by including a transmitting/receiving unit 21, a controlling unit 22, a location information managing unit 23 and a user data processing unit 24.

The transmitting/receiving unit 21 makes a connection to a wireless communication network via an antenna, and transmits/receives a wireless signal between a corresponding one of the eNB 30-1 and 30-2 or between the FeNBs 40-1 and **40-*n***.

The controlling unit 22 controls operations of the units included in the UE 20, generates transmission data transmitted by the transmitting/receiving unit 21, and provides reception data received by the transmitting/receiving unit 21 to the user data processing unit 24. Moreover, the controlling unit 22 is configured to be able to notify the MME 10 of a base station identifier by providing the transmitting/receiving unit 21 with the base station identifier, notified from the location information managing unit 23, for identifying an FeNB to which the UE 20 is connected.

The location information managing unit 23 is one specific example of the first notifying means. The location information managing unit 23 identifies an eNB 30 or an FeNB 40, which accommodates the UE 20, and notifies the controlling unit 22 of the identified eNB 30 or FeNB 40. At this time, the location information managing unit 23 determines whether a cell that accommodates the UE 20 is subordinate to either eNB 30 or FeNB 40, for example, according to reception power when a signal output from the eNB 30 or the FeNB 40 is received. Moreover, the location information managing unit 23 notifies the controlling unit 22 of a base station identifier for identifying the FeNB 40 if the UE 20 is accommodated by a cell subordinate to the FeNB 40.

Additionally, the location information managing unit 23 may be configured to store a base station identifier for identifying an FeNB 40 that provides a cell visited by the UE 20, or the like and to notify the controlling unit 22 of the base station identifier, if the UE 20 is a stationary terminal that is not assumed to frequently move by straddling TAs.

In the meantime, the location information managing unit 23 may be configured to include a database of FeNBs 40, to which the UE 20 is connectable, based on a use state and a subscription of the UE 20, and to notify the controlling unit 22 of the base station identifier for identifying the FeNB 40, to which the UE 20 is currently connected, by referencing the database.

In a standard such as LTE or the like, an eNB 30 and an FeNB 40 constantly transmit a TA identifier that indicates a TA accommodating a cell to the UE 20 that is currently visiting the cell as system information broadcast. The location information managing unit 23 recognizes that the TA has changed by analyzing the received system information.

The user data processing unit 24 processes reception data provided from the controlling unit 22, outputs the processed data, for example, from a speaker not illustrated as voice information, and provides transmission data to be transmitted to the controlling unit 22.

The eNBs 30-1 and 30-2 are one specific example of a first base station, and are base stations that provide, for example, a macro-cell. FIG. 1 depicts an example where the two eNBs 30-1 and 30-2 are accommodated by a TA subordinate to the MME 10.

The FeNBs 40-1 to **40-*n* are one specific example of the second base station, and are small base stations that provide, for example, a femto-cell. In FIG. 1, n FeNBs 40-1 to 40-*n* are accommodated in the TA subordinate to the MME 10. The FeNB 40** may provide a home cell covering a home, an office cell covering an office, a hot spot cell installed as a hot spot, or the like in addition to or as a replacement for the femto-cell.

Configurations of the eNBs 30-1 and 30-2, and the FeNBs 40-1 to **40-*n* are described with reference to a block diagram of FIG. 4. As illustrated in FIG. 4, an eNB 30 is configured by including a transmitting/receiving unit 31, a controlling unit 32 and an interface 33**.

The transmitting/receiving unit 31 makes a connection to a wireless network via an antenna, and transmits/receives a wireless signal.

The controlling unit 32 transmits a signal for controlling the units included in the eNB 30 or the UE 20, and generates a signal transmitted/received via the transmitting/receiving unit 31 or the interface unit 33.

The controlling unit 32 is one specific example of second notifying means. The controlling unit 32 adds a base station identifier of the local eNB 30 to a message transmitted from the UE 20 that is currently visiting a cell of the local eNB 30, and transfers the message to the MME 10.

The interface unit 33 is an interface for transmitting/receiving a signal to/from the MME 10 that is a upper node connected to the network, or to/from another adjacent eNB 30 or FeNB 40.

A configuration of the FeNB 40 and operations of the respective units may be similar to those of the eNB 30.

The HSS 50 is a database for managing user information associated with the UE 20, and information of the MME 10 and base stations subordinate to the MME 10. The HSS 50 receives a notification such as a location registration update message from the MME 10, for example, when the UE 20 that is visiting a base station subordinate to the MME 10 moves by straddling TAs, and updates the user information of the UE 20.

A TA that is a unit in which the MME 10 manages a movement of the UE 20 is formed with cells of a plurality of eNBs 30 and FeNBs 40. In the example of FIG. 1, a TA identifier that is "TA#1" is assigned to a TA formed with cells of the base stations the eNBs 30-1 and 30-2, and the FeNBs 40-1 to **40-*n* as a TA subordinate to the MME 10. Moreover, another TA#0 that is a TA formed with cells of other eNBs 30 and FeNBs 40 is present subordinately to the MME 10**.

A location registration process and a paging process, which are executed in a general wireless communication system in a conventional 3GPP standard, are described prior to descriptions of a location registration process and a paging process, which are executed for the UE 20 in the wireless communication system according to the first embodiment.

FIG. 5 is a sequence diagram illustrating the location registration process and the paging process, which are executed in the conventional wireless communication system. The sequence diagram of FIG. 5 represents the location registration process executed when a TA visited by the UE 20 changes from TA#0 to TA#1, and the paging process executed thereafter. For the location registration process and the paging process, which are disclosed by the above described Non-Patent Document 1, MME that controls the location registration and the paging process, and S-GW (Serving GateWay) that transmits/receives a data packet are referred to as different entities. In the sequence diagrams of FIGS. 5 to 8, however, MME and a packet transfer function of the S-GW are collectively represented as MME 10.

Initially, the UE 20 recognizes that the TA has changed by receiving a TA identifier (TA#1 in FIG. 5) transmitted from the eNB 30-1 visited by the local UE 20, after the visited TA has changed from TA#0 to TA#1. Then, the UE 20 transmits to the eNB 30-1 a TA update message indicating that the TA has been updated. "TA Update" is used as a specific message element at this time. This message includes a TA identifier (TA#1 in the example of FIG. 5) after being updated.

The eNB 30-1 transfers the TA update message to the MME 10 after receiving the message.

After receiving the message, the MME 10 transmits to the HSS 50 a location update request message for requesting an update of the location of the UE 20. "Update Location Request" is used as a specific message element at this time. This message includes the TA identifier (TA#1 in the example of FIG. 5) after being updated.

The HSS 50 updates the TA identifier (TA#0 in the example of FIG. 5), which was previously registered in association with the UE 20, to the TA identifier (TA#1) included in the received message after receiving the location update request message, and transmits to the MME 50 a location update acknowledgment message as a completion notification. "Update Location Ack" is used as a specific message element at this time.

The MME 10 that has received the location update acknowledgment message from the HSS 50 stores the TA identifier of the UE 20 in the UE information managing unit 12, and transmits to the eNB 30-1 a TA update acknowledgment message as a completion notification of the TA update. "TA Update Ack" is used as a specific message element at this time.

The eNB 30-1 transfers the TA update acknowledgment message to the UE 20 after receiving the message, so that the location registration process is completed. When an incoming call occurs to the UE 20 thereafter, the MME 10 is notified that a downstream packet to the UE 20 has arrived at the S-GW of the MME 10 from the mobile network.

The MME 10 searches for a TA identifier indicating the TA visited by the UE 20, and transmits a paging signal to all the eNBs 30-1, 30-2 and the FeNBs 40-1 to 40-*n*, which are all the base stations forming the TA #1. The base stations that have respectively received the paging signal transmit the paging signal to local cells provided respectively by the base stations.

At this time, the UE 20 that is currently visiting the eNB 30-1 returns a paging reply signal to the eNB 30-1 after receiving the paging signal via the eNB 30-1. The eNB 30 that has received the paging reply signal transfers the paging reply signal to the MME 10. As a result, the MME 10 can recognize which base station the UE 20 is currently visiting, and can transmit a downstream packet via the corresponding base station.

Figure 6:
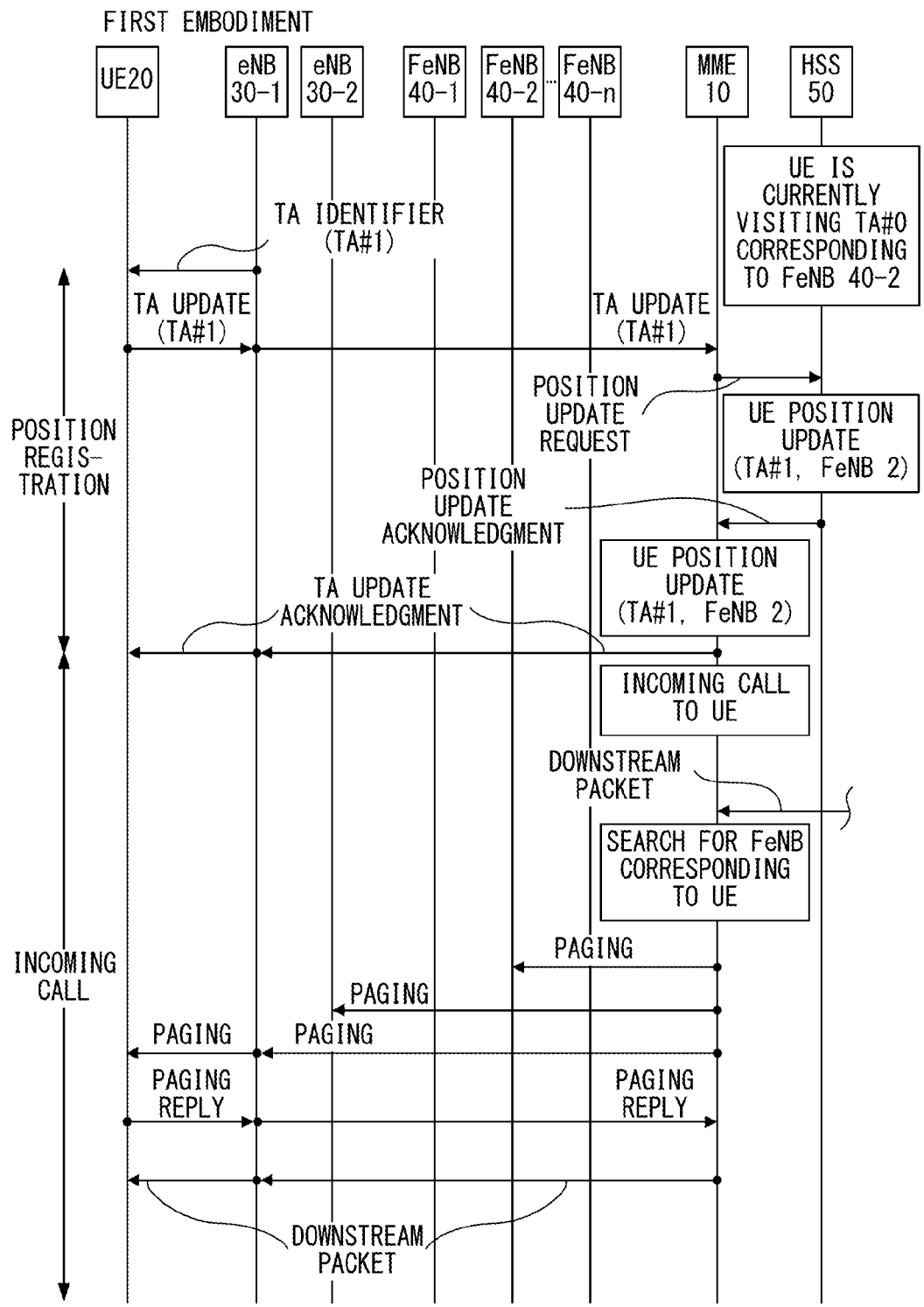
FIG. 6 is a sequence diagram illustrating a location registration process and a paging process according to the first embodiment.

A location registration process and a paging process, which are executed for the UE 20 in the wireless communication system according to the first embodiment, are described next with reference to the sequence diagram of FIG. 6. As illustrated in FIG. 6, in the first embodiment, the UE 20 is a terminal connectable, for example, to the FeNB 40-2 preset in a home or an office, and the HSS 50 stores the FeNB 40-2 as a subscription of the UE 20 by making the FeNB 40-2 correspond to the UE 20. In other words, the UE 20 is connectable only to the FeNB 40-2 among the FeNBs 40-1 to 40-*n* accommodated in the TA#1. Accordingly, in the first embodiment, the HSS 50 stores the base station identifier indicating the FeNB 40-2 to which the UE 20 is connectable as user information in a memory or the like not illustrated in addition to the TA identifier indicating TA currently visited by the UE 20.

The sequence diagram of FIG. 6 represents the location registration process executed when the TA currently visited by the UE 20 changes from TA#0 to TA#1, and the paging process executed thereafter. In the sequence diagram of FIG. 6, descriptions of processes similar to those of FIG. 5 are omitted.

The UE 20 recognizes the new TA#1 based on the TA identifier transmitted from the eNB 30-1 after the TA visited by the UE 20 has changed from TA#0 to TA#1, and transmits a TA update message including the TA identifier to the eNB 30-1. The TA update message is transferred from the eNB 30-1 to the MME 10.

The MME 10 transmits to the HSS 50 a location update request message including the TA identifier (TA#1 in the example of FIG. 6) for requesting an update of the location of the UE 20.

The HSS 50 updates the TA identifier (TA#0 in the example of FIG. 6), which was previously registered in association with the UE 20, to the TA identifier that indicates the TA#1 and is included in the received location update request message. At this time, the HSS 50 refers user information further stored, and generates a location update acknowledgment message as a completion notification including information such as the base station identifier for identifying the FeNB 40-2 corresponding to the UE 20, and transmits the generated message to the MME 10.

The MME 10 that has received the location update acknowledgment message stores the base station identifier of the FeNB 40-2 in the UE information managing unit 12 along with the TA identifier TA#1 of the UE 20. Moreover, the MME 10 transmits a TA update acknowledgment message to the eNB 30-1 as a completion notification of the TA update.

The eNB 30-1 transfers the TA update acknowledgment message to the UE 20 after receiving the message, so that the location registration process is complete.

When an incoming call occurs to the UE 20 thereafter, the MME 10 is notified that a downstream packet to the UE 20 has arrived.

The MME 10 searches the UE information managing unit 12 for a TA identifier indicating a TA currently visited by the UE 20, and a base station identifier indicating an FeNB 40 to which the UE 20 is connectable, and identifies the FeNB 40-2 to which the UE 20 is connectable. Then, the MME 10 transmits a paging signal to the eNBs 30-1 and 30-2, which form the TA#1, and the FeNB 40-2 identified based on the searched base station identifier. At this time, the MME 10 does not transmit the paging signal to the FeNBs 40-1 and 40-3 to 40-*n*, which are small base stations other than the FeNB 40-2.

The base stations that have respectively received the paging signal transmit the paging signal to their local cells.

The UE 20 that is currently visiting the eNB 30-1 returns a paging reply signal to the eNB 30-1 after receiving the paging signal via the eNB 30-1, so that the MME 10 can recognize which base station the UE 20 is currently visiting, and can transmit a downstream packet via the corresponding base station.

Thereafter, even if the UE 20 performs a handover within the TA#1 to visit the FeNB 40-2, the MME 10 performs paging for the eNBs 30-1, 30-2, and the FeNB 40-2. Therefore, the UE 20 can preferably receive the paging signal.

With the above described series of processes, the paging signal is transmitted to all the eNBs 30-1, 30-2 and the FeNB 40-2 to which the UE 20 is connectable among the base stations within the TA#1. Accordingly, the volume of traffic within the network can be significantly reduced in comparison with the case where the paging signal is transmitted to all the base stations within the TA#1. Especially, many FeNBs 40-1 to 40-*n* are expected to be arranged within the TA#1. Therefore, with the paging process according to the first embodiment, a processing burden imposed on the MME 10 can be dramatically reduced, which is very advantageous in terms of operating the network.

The above description refers to the example of the case where the UE 20 visits the eNB 30-1 within the TA#1. However, even if the UE 20 visits another base station (namely, any of the eNB 30-2 and the FeNBs 40-1 to 40-*n*) to which the UE 20 is connectable within the TA#1, the location registration process and the paging process can be executed with similar procedures. As a result, similar effects can be produced.

Additionally, the above description refers to the case where the UE 20 is only connectable to the FeNB 40-2 among the FeNBs 40-1 to 40-*n* accommodated in the TA#1. However, the UE 20 may be connectable to another FeNB 40 or a plurality of FeNBs 40. At this time, the HSS 50 has base station identifiers for respectively identifying all FeNBs 40, to which the UE 20 is connectable, as user information of the UE 20. Moreover, the MME 10 transmits a paging signal to all the FeNBs 40 to which the UE 20 is connectable, similarly to the FeNB 40-2 according to a noted base station identifier.

(2) Second Embodiment

Figure 7:
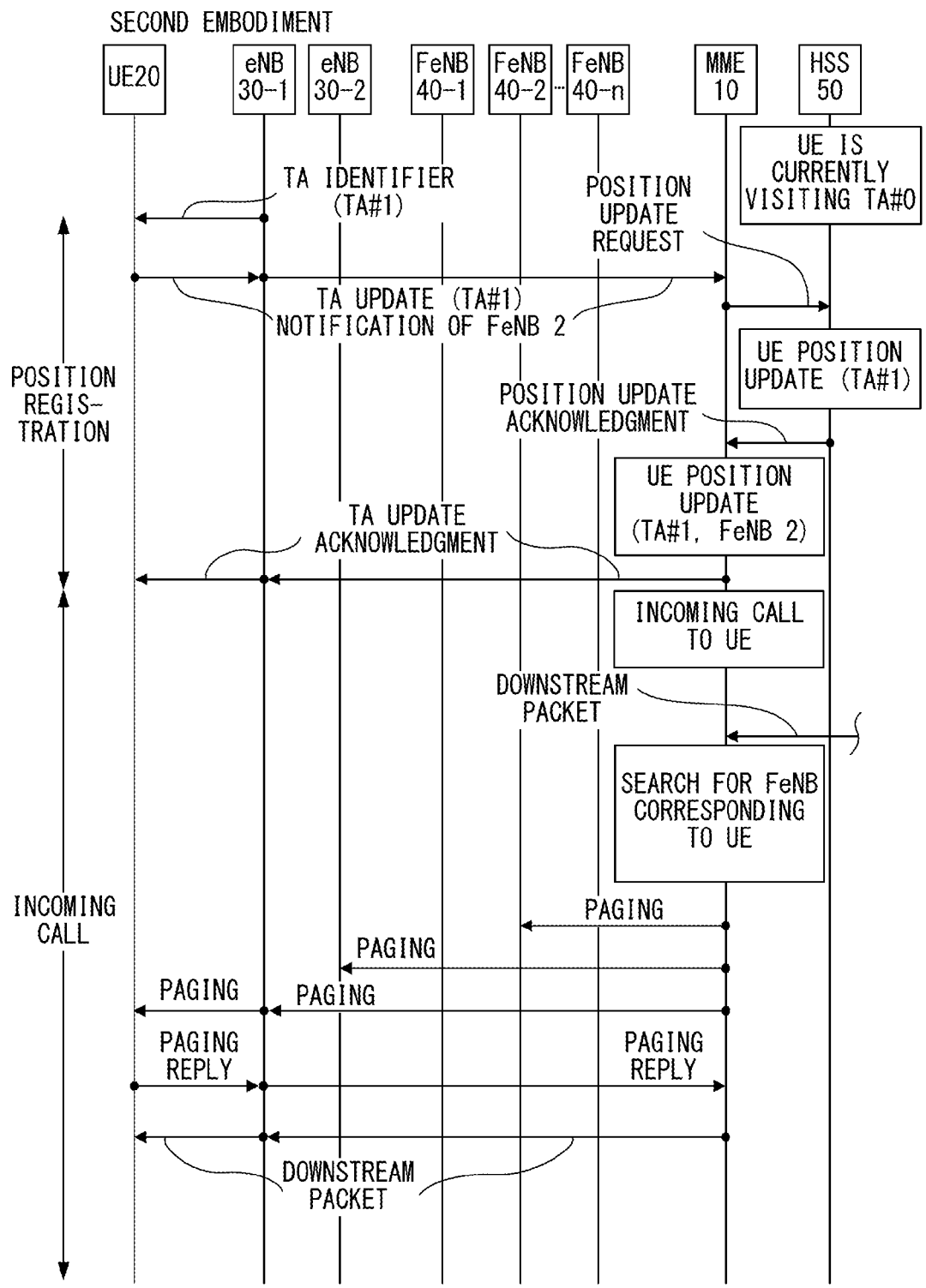
FIG. 7 is a sequence diagram illustrating a location registration process and a paging process according to the second embodiment.

A location registration process and a paging process, which are executed for the UE 20 according to a second embodiment, are described next with reference to the sequence diagram of FIG. 7.

Specifically, the UE 20 according to the second embodiment stores information such as a base station identifier for identifying the FeNB 40-2 to which the local UE 20 is connectable and which is preset in TA#1 in a location information managing unit 23. Configurations of a wireless communication system 1, MME 10, UE 20, eNB 30 and FeNB 40 according to the second embodiment may be similar to those according to the above described first embodiment illustrated in FIGS. 1 to 4. Hereinafter, the configurations are described by quoting FIGS. 1 to 4. Descriptions of processes similar to those of FIG. 5 or 6 are omitted.

The UE 20 recognizes new TA#1 based on a TA identifier transmitted from the eNB 30-1 after the TA currently visited by the local UE 20 has changed from TA#0 to TA#1. At this time, the UE 20 generates a TA update message including the base station identifier for identifying the FeNB 40-2, to which the local UE 20 is connectable and which is accommodated in the TA#1, along with the TA identifier TA#1, and returns the generated message to the eNB 30-1. The TA update message including the TA identifier and the base station identifier is transferred from the eNB 30-1 to the MME 10.

The MME 10 transmits to the HSS 50 a location update request message that includes a TA identifier and requests an update of the location of the UE 20.

The HSS 50 updates the TA identifier (TA#0 in the example of FIG. 7), which was previously registered in association with the UE 20, to the TA identifier (TA#1) included in the received message after receiving the location update request message, and transmits a location update acknowledgment message to the HSS 50 as a completion notification.

The MME 10 that has received the location update acknowledgment message stores in the UE information managing unit 12 the base station identifier of the FeNB 40-2 included in the TA update message transmitted from the UE 20 along with the TA identifier TA#1 of the UE 20. Moreover, the MME 10 transmits a TA update acknowledgment message to the eNB 30-1 as a completion notification of the TA update.

The eNB 30-1 transfers the TA update acknowledgment message to the UE 20 after receiving the message, so that the location registration process is completed.

When an incoming call occurs to the UE 20 thereafter, the MME 10 is notified that a downstream packet to the UE 20 has arrived.

The MME 10 searches the UE information managing unit 12 for a TA identifier indicating the TA currently visited by the UE 20, and a base station identifier indicating an FeNB 40 to which the UE 20 is connectable, and identifies the FeNB 40-2 to which the UE 20 is connectable. Then, the MME 10 transmits a paging signal to the eNBs 30-1 and 30-2, which form the TA#1, and the FeNB 40-2 identified based on the searched base station identifier. At this time, the MME 10 does not transmit the paging signal to the FeNBs 40-1 and 40-3 to 40-*n*, which are small base stations other than the FeNB 40-2. The base stations that have respectively received the paging signal transmit the paging signal to their local cells.

The UE 20 that is currently visiting the eNB 30-1 returns a paging reply signal to the eNB 30-1 after receiving the paging signal via the eNB 30-1, so that the MME 10 can recognize which base station the UE 20 is currently visiting, and can transmit a downstream packet via the corresponding base station.

Thereafter, even if the UE 20 performs a handover within the TA#1 to visit the FeNB 40-2, the MME 10 performs paging for the eNBs 30-1, 30-2 and the FeNB 40-2. Therefore, the UE 20 can preferably receive the paging signal.

With the above described series of processes, the paging signal is transmitted to all the eNBs 30-1, 30-2, and the FeNB 40-2 to which the UE 20 is connectable among the base stations within the TA#1 in a similar manner as in the first embodiment. Therefore, effects similar to the first embodiment can be produced even if the HSS 50 does not recognize the base station identifiers of the small bas stations FeNBs 40-1 to 40-*n*, which respectively correspond to UEs 20.

(3) Third Embodiment

A location registration process and a paging process, which are executed for a UE 20 according to a third embodiment, are described next with reference to the sequence diagram of FIG. 8. The third embodiment assumes a case where the UE 20 does not have information such as a base station identifier for identifying an FeNB 40-2 to which the local UE 20 is connectable in TA#1 and the information is not registered also in the HSS 50. At this time, the MME 10 identifies the base station identifier of the FeNB 40 (the FeNB 40-2 in the example of FIG. 8), to which the UE 20 is connectable and which the UE 20 is currently visiting, with the following procedures. Additionally, in the third embodiment, the base station identifier of the FeNB 40-2 is notified to the MME 10 by performing message transmissions similar to those at the time of the TA update in a pseudo manner among the UE 20, the FeNB 40-2 and the MME 10 when the UE 20 visits the FeNB 40-2. Such processes are described by assuming a case where a TA visited by the UE 20 has changed from TA#0 to TA#1 and a base station visited by the UE 20 has changed from the eNB 30-1 to the FeNB 40-2.

Configurations of a wireless communication system 1, MME 10, UE 20, eNB 30 and FeNB 40 according to the third embodiment may be similar to those according to the above described first embodiment illustrated in FIGS. 1 to 4. Hereinafter, the configurations are described by quoting FIGS. 1 to 4. Moreover, descriptions of processes similar to those illustrated in FIGS. 5 to 7 are omitted.

The UE 20 recognizes new TA#1 based on the TA identifier transmitted from the eNB 30-1 after the TA visited by the local UE 20 has changed from TA#0 to TA#1. At this time, the UE 20 generates a TA update message including the TA identifier TA#1, and transmits the generated message to the eNB 30-1. The TA update message including the TA identifier TA#1 is transferred from the eNB 30-1 to the MME 10.

The MME 10 transmits to the HSS 50 a location update request message that includes the TA identifier and requests an update of the location of the UE 20.

The HSS 50 updates the TA identifier (TA#0 in the example of FIG. 8), which was previously registered in association with the UE 20, to the TA identifier (TA#1) included in the received message after receiving the location update request message, and transmits a location update acknowledgment message to the MME 50 as a completion notification.

The MME 10 that has received the location update acknowledgment message stores the TA identifier (TA#1) of the UE 20 in the UE information managing unit 12, and transmits a TA update acknowledgment message to the eNB 30-1 as a completion notification of the TA update.

The eNB 30-1 transfers the TA update acknowledgment message to the UE 20 after receiving the message, so that the location registration process is completed.

Then, the UE 20 executes a location registration process similar to that at the time of the TA update in a pseudo manner after the base station visited by the local UE 20 has changed from the eNB 30-1 to the FeNB 40-2.

Under the 3GPP standard, the eNB 30 and the FeNB 40 constantly broadcast the base station identifiers of the eNB 30 and the FeNB 40 to the currently visiting UE 20 as system information broadcast. Therefore, upon recognizing that the base station that the local UE 20 is currently visiting has changed by analyzing the base station identifier included in the system information transmitted from the FeNB 40-2, the UE 20 transmits a TA update message including the TA identifier TA#1 to the FeNB 40-2. Such a TA update message is a dummy message, and transmitted to the FeNB 40 at a move destination even if the UE 20 moves between base stations accommodated in the same TA#1.

Then, the FeNB 40-2 that has received the TA update message including the TA identifier TA#1 adds the base station identifier for identifying the local eNB to the TA update message, and transfers the message to the MME 10.

The MME 10 that has received the TA update message stores in the UE information managing unit 12 the base station identifier of the FeNB 40-2 included in the TA update message. Then, the MME 10 transmits to the FeNB 40-2 a TA update acknowledgment message as a completion notification of the TA update. At this time, the MME 10 may make a selection of not transmitting a location update request message to the HSS 50 if the TA identifier included in the received TA update message remains unchanged before the message is received.

When an incoming call occurs to the UE 20 thereafter, the MME 10 is notified that a downstream packet to the UE 20 has arrived.

The MME 10 searches the UE information managing unit 12 for a TA identifier indicating the TA currently visited by the UE 20, and a base station identifier indicating an FeNB 40 to which the UE 20 is connectable, and identifies the FeNB 40-2 to which the UE 20 is connectable. Then, the MME 10 transmits a paging signal to the eNB 30-1 and 30-2, which form the TA#1, and the FeNB 40-2 identified based on the searched base station identifier. At this time, the MME 10 does not transmit the paging signal to the FeNBs 40-1 and 40-3 to 40-$n$, which are small base stations other than the FeNB 40-2. The base stations that have respectively received the paging signal transmit the paging signal to their local cells.

The UE 20 that is currently visiting the FeNB 40-2 returns a paging reply signal to the FeNB 40-2 after receiving the paging signal via the FeNB 40-2, so that the MME 10 can recognize which base station the UE 20 is currently visiting, and can transmit a downstream packet via the corresponding FeNB 40-2.

With the above described series of processes, the paging signal is transmitted to all the eNBs 30-1, 30-2, and the FeNB 40-2 to which the UE 20 is connectable among the base stations within the TA#1. Therefore, the volume of traffic within the network can be significantly reduced in comparison with the case of transmitting the paging signal to all the base stations within the TA#1.

According to the third embodiment, a base station identifier indicating a visited FeNB 40 can be notified to the MME 10 if the UE 20 is visiting any small base station FeNB 40. Accordingly, the visited FeNB 40 can be preferably identified even if an FeNB 40 corresponding to the UE 20 is not preset or if a base station identifier of a corresponding FeNB 40 cannot be refered by the UE 20 and the HSS 50. Therefore, it can be verified that even an unidentified FeNB 40 available to a UE 20 is currently visited by the UE 20.

As described above, according to the first to the third embodiments, the paging signal is not transmitted to all the FeNBs 40 even in a case where FeNBs 40, the number of which is larger than eNBs 30, are assumed to be arranged within a location registration area because of relatively low transmission power. Accordingly, the volume of traffic of the network used at the time of paging can be preferably reduced.

Additionally, according to the first to the third embodiments, there is no need to assign an individual TA to each FeNB 40, and to register a location each time the UE 20 enters/exits a relatively small cell of an FeNB 40. This is advantageous in terms of reducing the volume of traffic.

In the above provided description, a TA update message element similar to the "TA update message" transmitted by the UE 20 at the time of normal location registration is used to notify the MME 10 of the base station identifier of the FeNB 40-2 by the UE 20. However, other messages may be used as long as the base station identifier of the FeNB 40-2 can be notified.

The present invention is not limited to the above described embodiments. Various changes and modifications can be suitably made within a scope that does not depart from the spirit and scope of the present invention understood from the appended claims and the entire specification. A technical scope of the present invention also encompasses a wireless communication system, a communication control method, a mobility management apparatus, a mobile terminal, a base station and the like with such changes and modifications.

As described above, according to the disclosed wireless communication system, a paging signal is not transmitted to all second base stations even if the second base stations, the number of which is larger than first base stations, are assumed to be arranged within a location registration area because of relatively low transmission power. Accordingly, the volume of traffic of a network used at the time of paging can be preferably reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A wireless communication system comprising:
   a first base station;
   one or more second base stations that are small base stations having transmission power lower than the first base station;
   a mobility management apparatus for managing a location of a mobile terminal in a location registration area accommodating the first base station and the one or more second base stations, the mobility management apparatus including:
      a selecting unit that selects at least one of the second base stations transmitting a paging signal from among the one or more second base stations, and
      a paging unit that transmits a paging signal to the mobile terminal via the first base station accommodated in the location registration area, and the at least selected one of the second base stations.

2. The wireless communication system according to claim 1, wherein
   the mobility management apparatus comprises a storing unit that stores base station information for identifying the second base station visited by the mobile terminal, and
   the selecting unit selects the at least one of the second base stations transmitting the paging signal by referencing the base station information stored in the storing unit.

3. The wireless communication system according to claim 1, wherein
   the mobile terminal comprises a first notifying unit that notifies the mobility management apparatus of the base station information for identifying the second base station visited by the mobile terminal, and
   the selecting unit selects the at least one of the second base stations transmitting the paging signal by referencing the base station information notified by the first notifying unit.

4. The wireless communication system according to claim 3, wherein
   the first notifying unit notifies the mobility management apparatus of the base station information when the mobile terminal is visiting the location registration area managed by the mobility management apparatus.

5. The wireless communication system according to claim 1, wherein
   the one or more second base stations comprise a second notifying unit that notifies the mobility management apparatus of the base station information for identifying the one or more second base stations visited by the mobile terminal when the mobile terminal is visiting the one or more second base stations.

6. The wireless communication system according to claim 1, wherein
   the second base stations, the number of which is larger than the first base stations, are arranged in the location registration area.

7. The wireless communication system according to claim 1, wherein
   the wireless communication system adopts a standard of a Long Term Evolution (LTE).

8. A communication control method in a wireless communication system having a first base station, one or more second base stations having transmission power lower than the first base station, and a mobility management apparatus for managing a location of a mobile terminal in a location registration area accommodating the first base station and the one or more second base stations, the communication control method comprising:
   selecting at least one of the second base stations transmitting a paging signal from among the one or more second base stations, the one or more second base stations being small base stations, and
   transmitting a paging signal to the mobile terminal via the first base station accommodated in the location registration area and the at least selected one of the second base stations.

9. The communication control method according to claim 8, wherein the wireless communication system adopts a standard of a Long Term Evolution (LTE).

10. A mobility management apparatus for managing a location of a mobile terminal in a location registration area accommodating a first base station and one or more second base stations having transmission power lower than the first base station, the mobility management apparatus comprising:
    a selecting unit that selects at least one of the second base stations transmitting a paging signal from among the one or more second base stations, the one or more second base stations being small base stations, and
    a paging unit that transmits a paging signal to the mobile terminal via the first base station accommodated in the location registration area and the at least selected one of the second base stations.

11. The mobility management apparatus according to claim 10, wherein the mobility management apparatus adopts a standard of a Long Term Evolution (LTE).

12. A mobile terminal in a wireless communication system having a first base station, one or more second base stations having transmission power lower than the first base station, and a mobility management apparatus for managing a location of the mobile terminal in a location registration area accommodating the first base station and the one or more second base stations, the mobile terminal comprising
    a first notifying unit that notifies the mobility management apparatus of base station information for identifying the second base station accommodating the mobile terminal among the one or more second base stations, the one or more second base stations being small base stations.

13. The mobile terminal according to claim 12, wherein the wireless communication system adopts a standard of a Long Term Evolution (LTE).

14. One or more base stations accommodated in a location registration area in a wireless communication system, each of the base stations comprising
   a notifying unit that notifies a mobility management apparatus for managing a location of a mobile terminal in a location registration area of base station information for identifying a base station visited by the mobile terminal, when the mobile terminal visits any of the one or more base stations, wherein
   each of the base stations is a small base station.

15. The one or more base stations according to claim 14, wherein
   the wireless communication system adopts a standard of a Long Term Evolution (LTE).

* * * * *